United States Patent [19]

Vanha

[11] 4,400,425
[45] Aug. 23, 1983

[54] HIGH IMPACT CHEMICALLY ACTIVATED POLYESTER FIBER REINFORCED PLASTIC COMPOSITE

[76] Inventor: Vladimir Vanha, Rte. 3, Box 193B, Bryson City, N.C. 28713

[21] Appl. No.: 329,934

[22] Filed: Dec. 11, 1981

Related U.S. Application Data

[63] Continuation of Ser. No. 132,372, Mar. 21, 1980, abandoned.

[51] Int. Cl.³ .................. B32B 27/16; B32B 27/36; B32B 5/18
[52] U.S. Cl. .................. 428/246; 428/251; 428/252; 428/265; 428/285; 428/287; 428/288; 428/318.4; 428/319.1; 428/319.3; 428/480
[58] Field of Search .............. 428/229, 251, 252, 265, 428/285, 287, 395, 480, 911, 272, 288, 246, 318.4, 319.1, 319.3

[56] References Cited

U.S. PATENT DOCUMENTS

| | | | |
|---|---|---|---|
| 3,775,150 | 11/1973 | McClary | 428/395 |
| 3,893,488 | 7/1975 | Rogers | 428/265 |
| 3,993,828 | 11/1976 | McCorsley III | 428/252 |
| 4,039,709 | 8/1977 | Newman | 428/287 |
| 4,044,189 | 8/1977 | Arrowsmith | 428/480 |
| 4,109,453 | 8/1978 | Kobayashi et al. | 19/105 |
| 4,109,543 | 8/1978 | Foli | 428/246 |
| 4,172,917 | 10/1979 | Angelle et al. | 428/287 |

*Primary Examiner*—William J. Van Balen
*Attorney, Agent, or Firm*—Dority & Flint

[57] ABSTRACT

A reinforced plastic composite structure is disclosed which includes a fiberglass reinforced plastic structure wherein adhesive-activated thermally stabilized polyester fibers are included affording highly improved impact resistance.

7 Claims, 5 Drawing Figures

HIGH IMPACT CHEMICALLY ACTIVATED POLYESTER FIBER REINFORCED PLASTIC COMPOSITE

This is a continuation of application Ser. No. 132,372, filed Mar. 21, 1980, now abandoned.

BACKGROUND OF THE INVENTION

The use of synthetic fibers in fiber and fiberglass reinforced plastic have been known such as the use of nylon, polypropylene, and aramid fibers to improve the structural characteristics of the reinforced plastic structure. However, while improving some of the characteristics, the fibers increase the cost and often cause adhesion problems resulting in possible separation of the laminates or other fiber structure.

It has also been known in U.S. Pat. No. 4,109,543 to utilize polyester fibers to form a flexible composite laminate of woven polyester fabric and a thermoplastic material for use in products such as conveyor belting and vehicle tires. However, to obtain a high degree of flexibility of the laminate, a polyester fabric is utilized which is nonchemically bonded to the thermoplastic material whereby the laminate will flex without developing cracks in the surfaces of the laminate.

Adhesive-activated polyester fibers have been utilized in flexible structures in combination with rubber such as in garden hoses, fire hoses, dryer felts, ropes, cordage, etc.

SUMMARY OF THE INVENTION

It has been found according to the invention that chemically-activated polyester fibers may be utilized in semi-rigid thermoset reinforced plastic structures to provide a tougher, more impact resistant structure with the adhesion and elongation properties of the chemical activated polyester fibers tending to maintain the composite structure together where tougher fibers such as aramic fibers have heretofore failed. The polyester fibers have been found to be more economical and produce a more lightweight material which is important in many applications. It has been found that the composite structure of the invention retains coherent bonding and resists total structural failure for a much longer time after initial breakage under high impact than the synthetic fibers heretofore utilized as reinforcement in thermoset plastic structures.

Accordingly, an important object of the present invention is to provide a fiber reinforced plastic structure having improved impact breakage resistance.

Another important object of the present invention is the provision of an improved semi-rigid fiber reinforced plastic structure wherein chemically activated synthetic fibers are added which hold the composite structure together under stress particularly of impact and compact loads which is particularly advantageous in preventing delamination and destruction in laminated structure.

Still another important object of the present invention is the provision of a high impact fiberglass reinforced plastic structure wherein adhesive-activated polyester fibers are included which provide a more ductile product in which the fibers and matrix are coherently bonded to resist total breakage failure during impact.

Yet another important object of the present invention is to provide a composite structure which includes fiberglass reinforced plastic and chemically activated polyester fibers in a matrix in which adhesion of the polyester fibers in the matrix resin retains the rigidity of the structure yet provides a highly impact resistant structure which tends to resist structural separation after initial impact.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
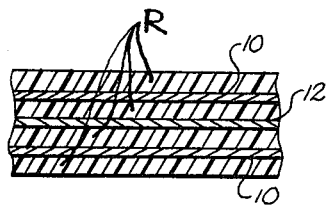
FIG. 1 is a schematic view of a section of the composite structure formed according to the invention.

The invention relates to reinforced plastic composite structures and more particularly to fiberglass reinforced plastics (FRP) wherein a chemically activated polyester fiber is introduced as a safety layer which holds the composite structure together after impact. In laminated structures, such has been found, quite unexpectedly, to resist and prevent delamination under impact loads and hold the structure substantially together even after breakage occurs.

For purposes of illustrating the invention, without limitation thereof, the following examples are described wherein the resin layers are exagerated in the drawings for illustrative purposes.

Referring to FIG. 1, a laminated structure is shown which includes a pair of outer layers 10 of chemically activated polyester fibers and an intermediate layer 12 of fiberglass all of which may be laminated by hand layup or vacuum-bagging in a resin matrix R in a conventional manner.

Figure 2:
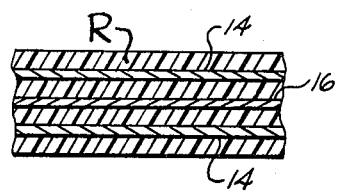
FIG. 2 is a schematic view illustrating in section another form of a composite structure formed according to the invention.

FIG. 2 illustrates a composite structure in which outer layers 14 consist of fiberglass and in intermediate layer 16 of chemically activated polyester fibers is provided in a resin matrix.

Figure 3:
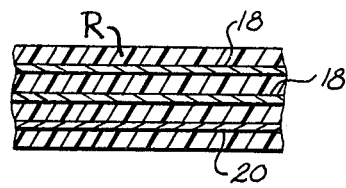
FIG. 3 is a schematic sectional view illustrating a composite structure constructed according to the invention.

FIG. 3 illustrates another embodiment in which the outer and medial layers 18 comprise fiberglass and the remaining outer layer 20 is formed of chemically activated polyester fibers.

The arrangement illustrated in FIG. 1 has been found to be advantageous where abrasion resistance is desired wherein the chemically activated polyester, as an overlay on the fiberglass 12, preserves the surface against miniscule fractures common with fiberglass. The polyester does not fray as much as other synthetic fibers. Of course, the arrangement of the layup of the composite layers may be had in any number and configuration as a particular application requires.

In the laminated composite structures illustrated above, chemically activated polyester fabric woven in a plain flat weave was utilized having a weight of approximately six ounces per square yard. Chemically or adhesive activated polyester fibers which have a chemically active surface which contributes to the bond between the fabric and the resin matrix is commercially available from the Celanese Corporation as Fortrel polyester fibers type 811. While polyester has been promoted for industrial use in flexible plastic and rubber structures such as belting, hoses, cordage, and tires, the application of chemical activated polyester fibers in semi-rigid thermoset fiber reinforced plastic structures has not been previously suggested and the improved structural characteristics under high impact loads provided in such systems is quite advantageous and unexpected. Further information on the chemical structure of the polyester fibers may be obtained from the Celanese product description sheet A/8 as well as U.S. Pat. No. 3,775,150. For purposes of the disclosure, chemical or adhesive activated fibers are referred to interchangeably as such.

In one application of the composite structure of the invention, a white-water kayak was constructed using woven chemically activated polyester fabric laminated utilizing conventional hand-layup techniques with fiberglass and a thermosetting resin. A particularly suitable thermosetting resin matrix is vinyl-modified polyester resin identified as Duracane 80–84A manufactured by Dow Chemical Co. However, any suitable resin such as a polyester, epoxy, or, vinylester resin system may be utilized. A woven fabric of general type E glass was utilized in the fiberglass laminate, although glass in mat or any other form may be utilized. A suitable catalyst is used such as a MEKP catalyst. Heating may also be utilized to afford even better adhesion in the matrix structure, however, such is not required. The kayak was laminated in a polyester, glass, glass, polyester construction.

By substituting the chemically activated polyester fibers for one or more layers of the fiberglass or for one or more layers of the aramid, nylon, etc. heretofore used in reinforcing conventional fiberglass laminates, a laminate was constructed having lower weight for essentially the same strength having especially favorable impact strength. The laminate or other composite structure containing the polyester fibers is very ductile, the fibers having excellent elongation characteristics, and can be bent in a very small radius without breaking. This is particularly valuable for semi-rigid thermoset structures such as white-water kayaks whose impact strengths against rocks and the like is critical and in the construction of automobile body parts such as fenders, etc. wherein resistance to sharp impact loads is critical but which must maintain structural integrity and be rigid in normal application.

It is to be understood that other methods of forming fiber reinforced thermoset plastic structures utilizing the chemically activated polyester fibers disclosed herein may be utilized such as injection molding. In injection molding, the invaluable adhesive and thermal properties of the chemically activated polyester fibers may be taken advantage of by utilizing such fibers in chopped or staple form as desired for the application being made wherein they are injected with chopped glass and matrix into a mold utilizing conventional injection molding techniques heretofore utilized with glass fiber reinforced injection molding. Such is particularly advantageous in the forming of molded parts for automobiles and airplanes, all of which benefit from the coherent bonding provided by the polyester fibers in the molded construction under sharp impacts. Other methods of forming composite structures of reinforced plastic may also be had wherein utilizing the bonding of the chemically activated polyester fibers therein provides the quite unexpected results of resistance to structural separation after initial impact according to the invention.

Figure 5:
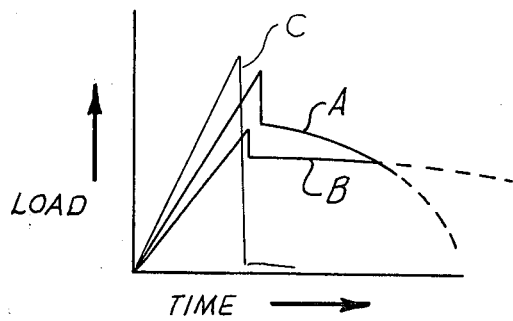
FIG. 5 is a schematic graphical representation illustrating laboratory testing results of impact strength for a fiber reinforced structure according to the invention compared to conventional structure.

FIG. 5 represents laboratory testing wherein it was found that a fiberglass reinforced plastic (FRP) structure provided with chemically activated polyester fibers or fabric (line B) resisted total failure and separation after initial impact breakage (apex) beyond that of a fiberglass reinforced plastic structure (line A) which included a comparable amount of aramid fibers or fabric and a comparable conventional fiberglass reinforced plastic (FRP) composite structure (line 6). Approximately 6 oz. (sq. yd.) fabric was utilized.

Depending on the percentage of fibers in the FRP construction and the extent of chemically activated polyester used in ratio to fiberglass, the weight of a composite previously made only from fiberglass can be reduced as much as one-third. This weight reduction can be more or less depending on the physical properties needed to be reached. In applications where rigidity needs to be sustained the use of chemically activated polyester may be less than fifty percent of the fibers.

Figure 4:
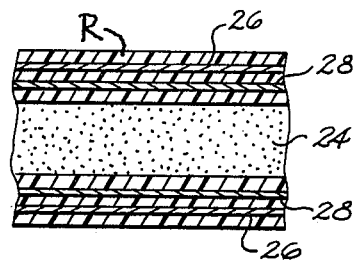
FIG. 4 is a schematic section of a composite structure according to the invention having a synthetic foam core.

In applications where light-weight material is required, a core layer of synthetic foam material 24 may be utilized as illustrated in FIG. 4. The illustrated composite structure includes an outer layer of chemically activated polyester fibers or fabric 26, a layer 28 of fiberglass fabric or mat, core 24, an identical layer 28 of fiberglass, and an identical outer layer 26 of polyester, all of which are laminated in a suitable resin matrix as described above. The core 24 may be sprayed or in sheet form from any suitable foam such as Airex brand foam material available from the Lonza Corporation. Such structure is strong, rigid and light-weight while possessing the resistance to total failure after an initial sharp impact afforded by the chemical activated polyester according to the invention.

While a preferred embodiment of the invention has been described using specific terms, such description is for illustrative purposes only, and it is to be understood that changes and variations may be made without departing from the spirit or scope of the following claims.

What is claimed is:

1. A high impact-fiber reinforced plastic composite structure comprising:
   a resin matrix;
   a plurality of treated chemically-activated polyester fibers included with said resin matrix and reinforcing fibers;
   said polyester fibers being treated to have an adhesively activated surface prior to inclusion in said matrix enhancing the degree of fiber to resin adhesion in said resin matrix providing coherent bonding of said composite structure under high impact loads to effectively resist structural separation after initial impact.

2. The structure of claim 1 wherein said reinforcing fibers and said polyester fibers are laminated in said composite structure.

3. The structure of claim 2 wherein said polyester fibers include continuous filaments woven in a plain weave which is laminated in said structure.

4. The structure of claim 1 wherein said composite structure comprises up to fifty percent weight of chemically-activated polyester fibers by fiber weight.

5. The structure of claim 1 wherein said reinforcing fibers are glass.

6. The structure of claim 2 including an inner core layer of synthetic foam material intermediate said reinforcing fiber layers providing increased rigidity and integrity to said structure.

7. In a fiberglass reinforced thermoset resin construction, the improvement comprising:
   inclusion of chemically-activated polyester fiber or fabric treated to have a chemically-activated surface prior to inclusion as an additional reinforcing element to increase the impact strength of the composite construction.

* * * * *